United States Patent
Garcia Rojo

(10) Patent No.: US 8,408,494 B2
(45) Date of Patent: Apr. 2, 2013

(54) AIRBAG SYSTEM FOR AIRCRAFT

(76) Inventor: Camilo Garcia Rojo, Colmenar del Arroyo (ES)

( * ) Notice: Subject to any disclaimer, the term of this patent is extended or adjusted under 35 U.S.C. 154(b) by 277 days.

(21) Appl. No.: 12/735,176

(22) PCT Filed: Apr. 23, 2008

(86) PCT No.: PCT/ES2008/000281
§ 371 (c)(1),
(2), (4) Date: Jun. 18, 2010

(87) PCT Pub. No.: WO2009/077628
PCT Pub. Date: Jun. 25, 2009

(65) Prior Publication Data
US 2010/0276540 A1    Nov. 4, 2010

(30) Foreign Application Priority Data
Dec. 18, 2007   (WO) .................. PCT/ES2007/000738

(51) Int. Cl.
*B64C 1/10* (2006.01)

(52) U.S. Cl. .................. 244/121; 244/122 R; 280/730.1
(58) Field of Classification Search ............... 244/118.5, 244/118.6, 121, 122 R; 280/728.1, 735, 280/736, 729, 730.1, 741
See application file for complete search history.

(56) References Cited

U.S. PATENT DOCUMENTS

| | | | |
|---|---|---|---|
| 5,470,103 A * | 11/1995 | Vaillancourt et al. | 280/730.1 |
| 2005/0104340 A1* | 5/2005 | Hasebe et al. | 280/730.1 |
| 2008/0272580 A1* | 11/2008 | Breed | 280/735 |
| 2008/0284145 A1* | 11/2008 | Breed | 280/736 |

* cited by examiner

*Primary Examiner* — Christopher P Ellis
*Assistant Examiner* — Medhat Badawi

(57) ABSTRACT

The invention relates to an airbag system for aircraft, intended to protect crew and passengers. The system comprises: inflatable cushions; a supply of air from individual tanks, communal tanks and the aircraft APU; a connection to the landing gear and the altimeter; a manual switch; an approach and contact sensor enabling automatic activation; electric lines, electrovalves and air ducts. The system also includes a second version which is activated using electrochemical batteries which operate on the basis of sharp deceleration.

5 Claims, 3 Drawing Sheets

AIRBAG SYSTEM FOR AIRCRAFT

OBJECT

The present invention is related to an airbag system for use in all kinds of aircrafts, both civilian or commercial, sports, ultra light type, including those using rotors (Helicopters) and military aircrafts.

BACKGROUND

The use of airbags or inflatable cushions in automobiles is well known. Its use in other areas is very limited, for example, in motorcycles.

There are not backgrounds in the prior art about the use of airbags in aircrafts of any kind. However, the importance that the introduction of said airbags would have for saving lives o reducing the importance of personal injuries in the case of accidents, especially in times such as forced landing or take off is easy to imagine.

DESCRIPTION

The invention is an integral system of airbags for aircrafts which in the passenger aircrafts, as well as those of the sports, ultra light, etc, types consist of:
cushions inflatable by air or gas supply from tanks,
connection to the landing gear and to the aircraft altimeter,
supplemental supply of air or gas for inflating from auxiliary power unit,
manual switches for activation of the airbags installed in the cockpit and passenger decks, located and actionable from the instrument panel of the cockpit deck;
approach-contact sensor for automatic actuation of said cockpit and passenger decks airbag systems
electric lines and electrovalves for inflating the inflatable cushions located in the cockpit and passengers decks, and
air or gas conductive ducts.

The preferable location of the inflatable cushions in commercial aircrafts would be in the rear part of passengers' seats. In the cockpit decks with the existing controls to date, generally their most appropriate location would be on the ceiling. In the case of cockpit decks, wherein a single control system (Joystick) is planned, their most efficient location would be in an area of the instrument panel. A particular case is the gliders where, obviously, their installation must be carried out on the instrument panel.

The receptacles of the inflatable cushions, depending on the case, can adopt a parallelepipedical, spherical or any other type of configuration. They can be installed on the rear part of the seats or on the floor. They are equipped with pipes which connect them with the air tanks. The activation of the inflatable cushions is effected by means of electrovalves.

In the aircrafts of any kind and utilization having seats for the passage, the preferable location will be the rear part of the preceding seats. In any of this cases, for the first rows of seats the inflatable cushions can be installed in the front partition or ceiling. For the different models that the various commercial airlines currently employ, a study taking into account the different configuration, complexity and disposition of the seats must be carried out. Likewise, the seats being conventionally provided with hinged trays and/or television screens, their design will be consequently adapted and the spaces required for the expansion of the inflatable cushions must be preserved.

In the cockpit decks, due to the significant differences existing between the different models of aircrafts and the complexity of the various cabins, a study of location should be performed in each case, although generally the most appropriate location of the inflatable cushions would be on the ceiling, for example, using the type of blinds or the like. The cause resides in the fact that the control system of aircrafts, equivalent to the steering wheel in automobiles, utilizes different means for governing the same. Currently, in the new commercial aircrafts a single control system is being mounted (called "Joystick", the equivalent translation of which is direction control), located to the right and left of each pilot respectively, obviously, the most efficient location of the control apparatus will be in a zone of the navigation instruments panel such that they move in the same way as in the passage seats.

A particular case is gliders where, obviously, the realization and installation of airbags inside the instruments panel is obligatory.

Air or gas tanks for the inflatable cushions may be of the individual type or general tanks according to the design of the aircrafts. Individual tanks are arranged separately for each seat and those of the cockpit deck are located underneath by the lower zone of the floor or, in other words, by the ceiling of the cargo hold of the aircraft. On the contrary, according to the criteria of the different projects of the existing aircrafts, a propellant air or gas general tank for the system can be used, dispensing the gaseous fluid to each airbag, whether by rows or groups of seats, and to the cockpit deck. Likewise, in particular cases, the gas supplied by the auxiliary power unit (APU) of the aircraft could be used as the source of gaseous fluid. The airbag system is provided with pipes connecting it to the air or gas tanks. Its regulation will be generally effected by means of electrovalves. In the case of gliders or ultra light, an air or gas tank must be necessarily installed, since they lack of APU.

The receptacles wherein the non-inflated cushions of the airbag system are located, depending on the case, may adopt a parallelepipedical, spherical or any other type of configuration. The receptacles may be located at the rear part of the seats or on the floor. In the design, recessed spaces with the suitable configuration may be envisaged and the inflatable cushions may be placed therein, previously to the molding and/or foaming of the filling material of the passenger seats.

In the other hand, the airbag system can be designed for an individual installation. In this case, the technology described in terms of wiring, connections with alternative systems, valves, etc. used for the operating system of the airbags for both passenger seats as for the other areas of the aircraft described herein, may be replaced perfectly by electrochemical batteries operated by sharp deceleration, one for each airbag, calibrated to 9 G's. These batteries (commonly used by the Army) consist of two inner tanks filled with two chemicals, which when in contact as a result of sudden deceleration, lead to a chemical reaction with the consequent production of sufficient energy for the opening of the electro-valves or the functioning of a pyrotechnic system that would open the individual tanks of air or gas, thus activating the airbags. A battery of this type is, for example, the lithium ion MP/VL or similar from the Saft company.

These batteries would be connected directly to the airbag, thus becoming a fully autonomous system, eliminating any external connection and the technical problems that could arise with this type of installation.

In this case, as mentioned above, the airbag system for aircrafts of this invention consists of:

Inflatable cushions

Supply of air or gas from individual tanks

Electrochemical batteries operated by sharp deceleration; and

Air or gas conducting pipes inside the flight cabin, the T1 pipe going from the individual tank D1 to the instrument panel CI, the T3 pipe going from the said tank D2 to the ceiling and conductive pipes T going from the individual tank D3 to the passengers' booths.

BRIEF DESCRIPTION OF THE DRAWINGS

For a better understanding of the present invention, we will describe several preferred embodiments, based on the accompanying figures, of which.

DETAILED DESCRIPTION OF PREFERRED EMBODIMENTS OF THE INVENTION

Figure 1:
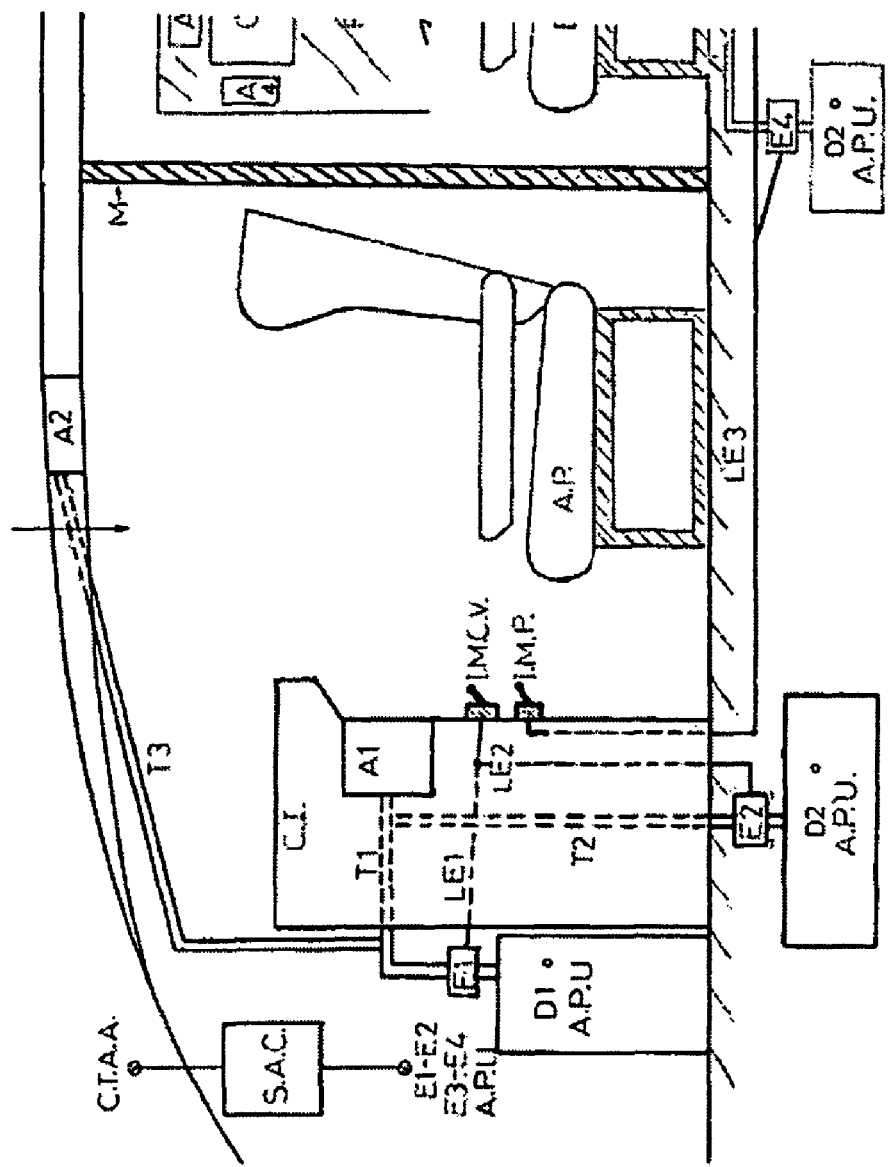
FIG. 1 shows a preferred location of airbags in both flight cabins of commercial aircrafts, private aircrafts (sport, ultralight, with rotors (helicopters)) as well as military.

1—Preferred embodiment of airbags in the flight cabins of commercial, private and military aircrafts. A first preferred embodiment of the invention is shown in FIG. 1, in which the elements included are identified by the following references:

A1-A2—airbag

APU—auxiliary power unit

AP—pilot seat

CI—instrument panel

CTAA—connection to the landing gear and altimeter (in the event that the landing gear does not come down at a certain altitude, due to technical or flight crew problems, the system would connect automatically, triggering the airbag in the cockpit and passenger's cabin)

D1-D2—air or gas tanks (locations of installation depend on the type of aircraft)

E1-E2—electro-valves (depending on the location of the air tanks)

IMCV—manual activation switch in cockpit airbags

IMP—manual activation switch for passengers

LE1-LE2—electrical lines (depending on the location of the air tanks)

M—bulkhead (divider between cockpit and passengers' cabin)

SAC—approach-contact sensor

T1-T2-T3—pipes for the air (depending on the location of the air tanks)

This embodiment provides the installation of the airbag system in the cockpit for the protection of the cabin crew; the system is governed manually by the crew, and automatically in the event that the staff fails to react on time. The cabin system governs not only the airbags installed in the cockpit, but also triggers the airbags installed in the department of the passengers.

FIG. 1 shows the inflatable airbag cushions, placed on the receptacles of the instrument panel, A1, and on the ceiling of the cabin, A2; the propellant air or gas supply that is executed from the individual air or gas tanks D1 or alternatively from the general deposit for the cabin D2 (their location of installation depend on the type of aircraft), or alternatively from the auxiliary power unit, APU, the pilot's seat, AP; the instrument panel CI; the connection to the landing gear and to the altimeter, CTAA; the electro-valves E1-E2 which in their turn are placed depending on the location planned for the tanks, the manual activation switch of the airbags installed in the cockpit, IMCV; the manual activation switch of airbags located in areas assigned to the passengers, IMP; the electrical lines LE1-LE2, whose installation depend on the location proposed for the air or gas tanks, the bulkhead separating the cabin M and the passenger area, the approach—contact sensor, SAC; air pipes, T1-T2-T3, their installation depending on the proposed installation location of air or gas tanks.

When being in an emergency situation due to technical problems, the staff of the cabin, by means of the manual switches for activation of the airbags installed in the cockpit IMCV, and for activation of the airbags located in the passenger area IMP, would trigger the electro-valves E1-E2, releasing the air or gas from the tanks D1-D2, or alternatively from the APU, hence inflating the inflatable cushions A1 located on the instrument panel of the cabin, and A2 on the roof of the cabin.

In the event that the landing gear does not come down at a certain altitude, due to technical problems or problems with the crew, the altimeter connected to a system for detection of lever lowering, would send a signal to the sensor to activate automatically the airbag system in response to the approach—contact sensor, SAC, (through the connection to the landing gear and to the CTAA altimeter), which at the same time would trigger the electro-valves E1-E2, thus releasing air or gas from these tanks D1-D2 or the said APU and inflating the cushions A1-A2.

So in line with the above, the automatic system would also inflate all passenger airbags.

2—Preferred embodiment of an airbag system placed in a cockpit of a glider (with or without engine), ultra light aircrafts, etc.

Figure 2:
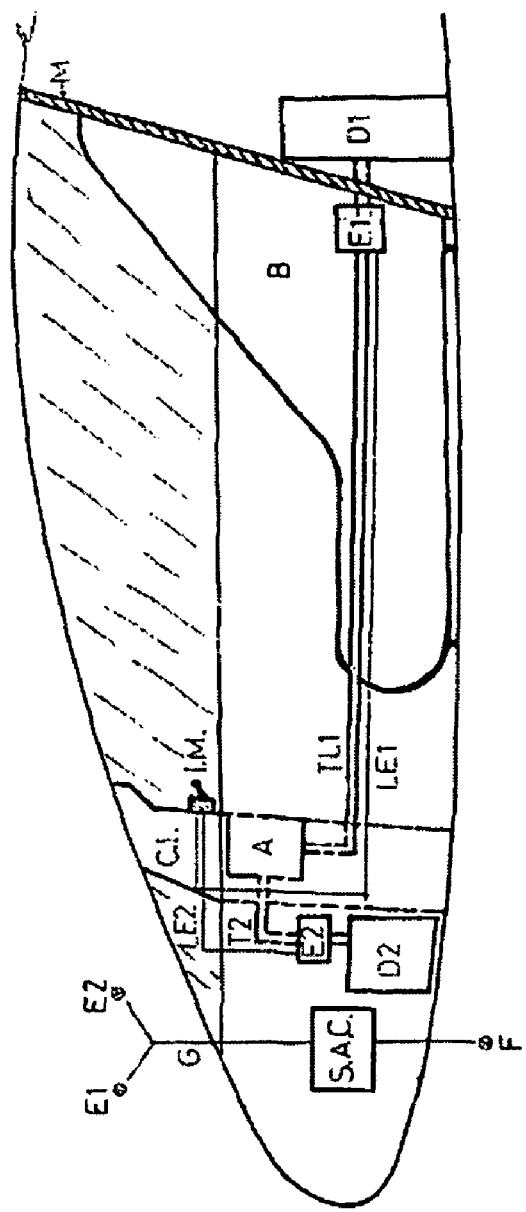
FIG. 2 shows also a preferred location of the airbag in a glider cockpit, ultra-lights, etc. . . .

Another preferred embodiment of the present invention is illustrated in FIG. 2, in which the elements included are identified in accordance with the following references:

| | |
|---|---|
| A | Airbag |
| B | Seat |
| CI | Instrument panel |
| D1-D2 | Air or gas tanks (places of installation depending on their location) |
| E1-E2 | Electro valves (depending on the air tanks location) |
| F | Connection landing gear and altimeter (if the pilot could not activate the landing gear at a certain height, the altimeter connected to a detection system of the position of the gear in charge of descending the landing gear would send a signal to the sensor to deploy the air bag). |
| G | Connection to E1-E2 |
| IM | Manual switch |
| LE1-LE2 | Electric lines (depending on the location of the air tanks) |
| SAC | Approach - contact sensor |
| T2 | Air duct |
| TL1 | Lateral air duct |
| M | Bulkhead dividing cabin - remaining areas |

This embodiment takes into account the specificity of the cockpit configuration as well as the feasible systems in small aircrafts as gliders, ultra light aircrafts, etc.

In FIG. 2 are illustrated: inflatable cushion, A; the seat, B; instrument panel CI; air or gas tanks, individuals D1 or alternatively from general tank for cabin D2, its location and installation inside or under the instrument panel will depend on the specific design of the cockpit; the electro valves E1-E2; the connection to the landing gear and to the altimeter, F; the connection G to said E1-E2; the manual switch, IM; the electric lines LE1-LE2, its location depending in turn on the location of the gas tank that impels gliders and ultra light aircrafts; the approach—contact sensor SAC; the air or gas duct T2; the lateral duct for the air or gas TL1; and the dividing bulkhead M.

In a way similar to preferred embodiment 1 when an emergency occurs due to technical problems, the pilot would activate the manual switch IM. Its signal would be transmitted through the connections to electric lines LE1-LE2, which would then activate the electro valves E1-E2 releasing the air or gas from the tanks D1-D2.

In case the pilot would not be able to activate the landing gear at a certain height, the altimeter connected to a detection system of the position of the gear in charge of descending the landing gear would send a signal to the sensor to activate the airbag, the approach—contact sensor SAC would send the signal to the electro valves E1-E2 which would release the air or gas from the tanks D1-D2.

3.—Preferred embodiment of an airbag system in the passengers area for commercial, private or military aircrafts.

Figure 3:
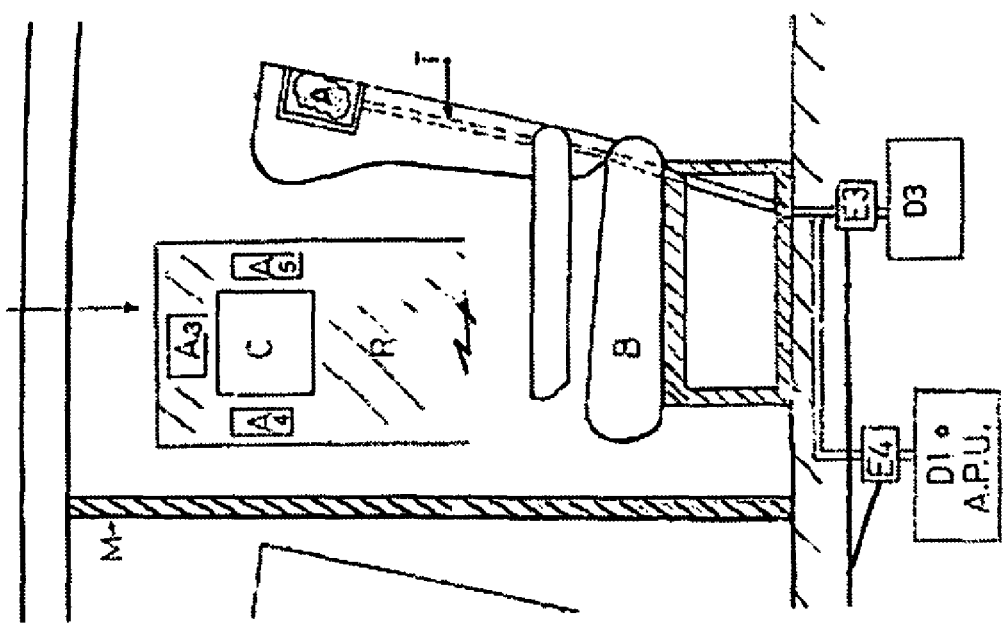
FIG. 3 shows a preferred location of airbags in the passenger seats located in rows behind other rows of seats, such seats provided at their back of a folding tray and/or TV monitor.

Another preferred embodiment of the present invention is illustrated in FIG. 3 and refers to the same type of aircraft of the first preferred embodiment (FIG. 1) but relating in this case to passengers' seats; in FIG. 3 the elements included are identified with the following references:

| | |
|---|---|
| A3-A4-A5 | airbag (possible locations depending of the type of seat) |
| B | seat |
| C | tray or TV monitor |
| D3 | individual tank |
| D2 or APU | general tank or APU |
| E3-E4 | Electro valves (depending on the location of the air tanks) |
| LE3 | Electric line connected to a manual switch in the cockpit and approach sensor. |
| R | back of the seat |
| T | air duct |

The location of the airbag system in the seats of the aircrafts transporting passengers is shown. There are different options depending on the type of seat; FIG. 3 shows the location of an air bag in a seat for passengers placed in any line behind the first one, and behind any other seat provided of a reclining tray and/or a TV monitor in a passengers' cabin.

There are shown: the inflatable cushions of the airbag A1-A2-A3, placed inside rectangular receptacles, located at three alternative places around the reclining tray of the seat; the seat B; the tray and/or TV monitor, C; the individual tank, D3; the general tank D2 or alternatively the supply from the APU; the electro valves E3-E4, their placement depending on the location of the air or gas tanks; the connecting electric line LE3 to the manual switch and to the approach sensor placed in the cockpit; the back of the seat, R; the air or gas supply duct, T.

Likewise, in the event that the crew would face an emergency situation due to technical problems, the staff in the cockpit would activate the electro valves E3-E4 using the manual switch to trigger the air bags placed in the passenger areas IMP and through the connecting electric line LE3, thus releasing the air or gas of the tanks D3, D2 or alternatively from the APU and inflating the inflatable cushions.

But if the pilot could not be able to activate the landing gear at a certain height, the altimeter connected to a system to detect the position of the gear in charge of descending the landing gear would send the signal to the sensor to activate the airbag system, the approach—contact sensor SAC would send the signal to the electro valves E3-E4 releasing the air or gas of the tanks; in this case the order to release the airbag system placed in the passengers area would be sent from the cockpit.

After describing the features of the present invention as well as three preferred embodiments, it should only be added that it is possible to carry out variations in the arrangement, shape and materials with departing from the scope and essence of the invention hereinafter claimed.

The invention claimed is:

1. Airbag system for aircrafts intended to protect both cabin crew and passengers, the system comprising: inflatable cushions, supply of air or gas from individual tanks, general tanks and from the aircraft APU, CTAA connection to the landing gear and to the altimeter of the aircraft, additional air and gas supply from the auxiliary power unit APU, manual switch IMC to activate the airbags located in the cockpit, and manual switch IMP to activate the airbags located in the passenger cabin, both said manual switches IMCV and IMP being located in, and operable from, the instrument panel CI in the cockpit, approach-contact sensor SAC enabling automatic activation of said airbag system, electric lines LE1-LE2 and electrovalves E1-E2 to inflate inflatable cushions located in the cockpit, electric lines LE3 and electrovalves E3 to inflate inflatable cushions located in the passengers cabin, and electrovalve E4 to actuate the air or gas supply from the general tank or from the auxiliary power unit APU, and air and gas duct pipes inside said cockpit, of which a duct T1 connecting an individual tank D1 to instrument panel CI, a duct T2 connecting a general tank D2 and the auxiliary power unit APU to the instrument panel CI, a duct T3 connecting both said tanks D1 and D2 and the auxiliary power unit APU to the ceiling, and ducts T connecting an individual tank D3 or alternatively a general tank D2 or the auxiliary power unit APU to the passengers cabin.

2. Airbag system for aircrafts intended to protect passengers the system comprising: inflatable cushions located inside the rear part of each passenger's seat in the passengers' cabin, air or gas supply from individual tanks, electrochemical batteries, one for each airbag, which operate on the basis of sharp deceleration, and ducts T connecting an individual tank D3 to the passengers' cabin.

3. Airbag system for aircrafts intended to protect both cabin crew and passengers as claimed in claim 1 or claim 2, wherein the airbag system located in the cockpit consists of inflatable cushions A1 mounted at the instrument panel and inflatable cushions A2 located in the ceiling; and wherein said airbag system in the passengers cabin consists of inflatable cushions A3-A4-A5 located on the backs of passenger seats in each row except for the first row, thus said inflatable cushions A3-A4-A5 being located in front of all passengers in rows behind the first row, and wherein for the first row inflatable cushions A2 are located either in the ceiling or on the front partition.

4. Airbag system for aircrafts intended to protect passengers as claimed in claim 2, wherein in gliders and other kinds of ultra light aircrafts the airbag system consists of inflatable cushions A located at the instrument panel CI in the cockpit.

5. Airbag system for aircrafts intended to protect both cabin crew and passengers as claimed in claim 1 or claim 2, wherein said inflatable cushions A3-A4-A5 placed on the back of each seat are located within rectangular-shaped receptacles that can be arranged in three alternative places around the reclining tray and/or the TV monitor for each seat.

* * * * *